(12) United States Patent
Jones

(10) Patent No.: US 8,733,538 B2
(45) Date of Patent: May 27, 2014

(54) VACUUM LINK CHAIN CONVEYOR

(76) Inventor: William D. Jones, Arvada, CO (US)

(*) Notice: Subject to any disclaimer, the term of this patent is extended or adjusted under 35 U.S.C. 154(b) by 316 days.

(21) Appl. No.: 13/135,869

(22) Filed: Jul. 18, 2011

(65) Prior Publication Data

US 2012/0211030 A1 Aug. 23, 2012

Related U.S. Application Data

(60) Provisional application No. 61/463,848, filed on Feb. 23, 2011.

(51) Int. Cl.
*B65G 37/00* (2006.01)
*B65G 17/06* (2006.01)
*B08B 7/00* (2006.01)

(52) U.S. Cl.
USPC ............ 198/689.1; 198/607; 198/339.1; 198/617; 134/137

(58) Field of Classification Search
None
See application file for complete search history.

(56) References Cited

U.S. PATENT DOCUMENTS

| | | | | |
|---|---|---|---|---|
| 2,649,214 A | * | 8/1953 | McGowan et al. | 414/327 |
| 3,838,766 A | * | 10/1974 | Wagers et al. | 198/380 |
| 2007/0287653 A1 | * | 12/2007 | Barthel et al. | 510/447 |

* cited by examiner

*Primary Examiner* — Kavel Singh
(74) *Attorney, Agent, or Firm* — Scott L. Terrell, P.C.; Scott L. Terrell

(57) ABSTRACT

A vertical closed loop link chain vacuum conveyor is provided. A conveying frame extends along a lane-like longitudinal conveying path. The frame has a vertical and longitudinally offset closed loop section. The closed loop section has a change in elevation including a decline and an incline, change in direction, and a central vacuum plenum. A multi-flex link chain is in guided support and travel in the conveying frame while running in trained contact about a link chain drive assembly. The multi-flex link chain is in evacuated communication with a suction generator is in ducted communication with the vacuum plenum.

8 Claims, 5 Drawing Sheets

FIG.2

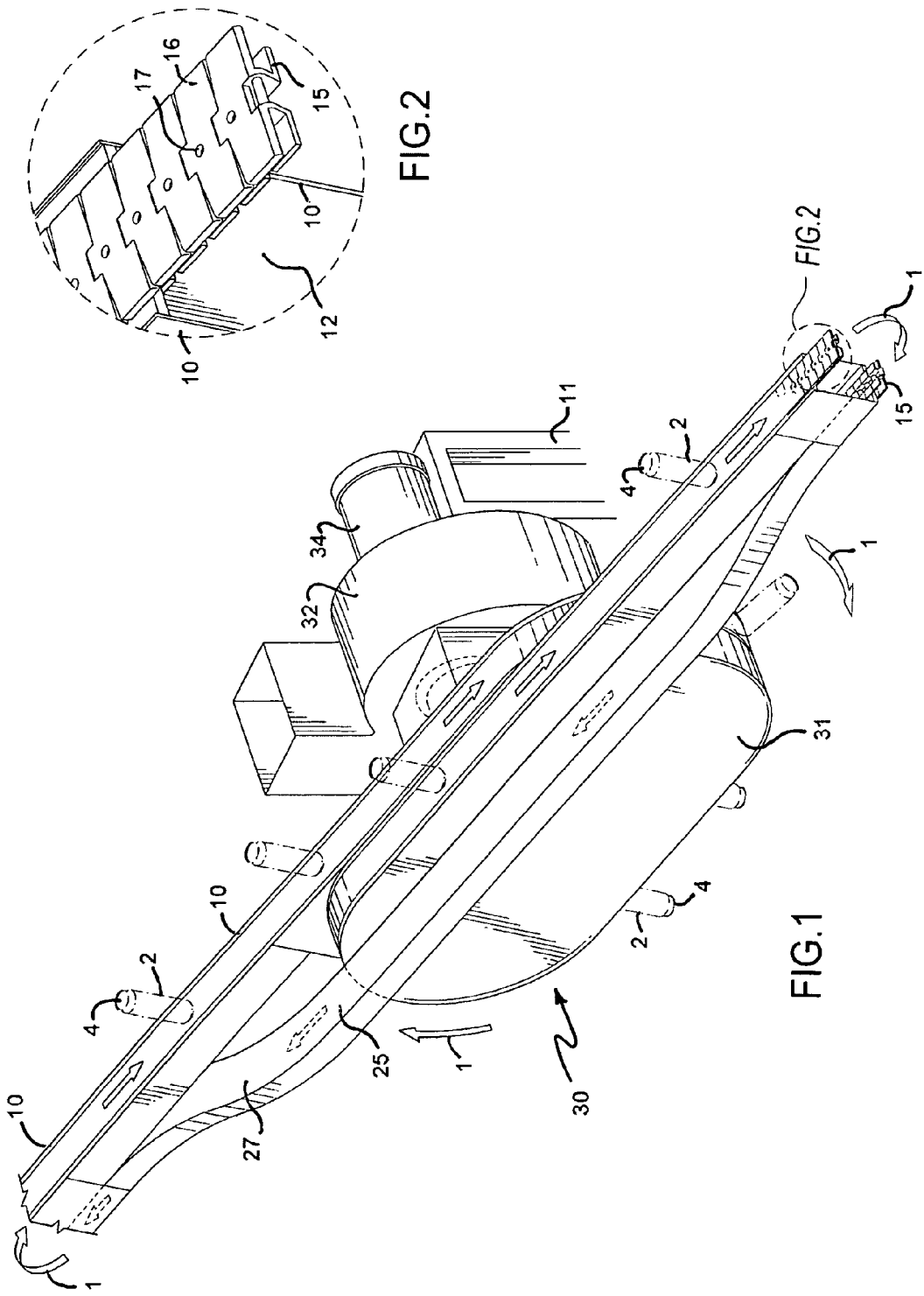

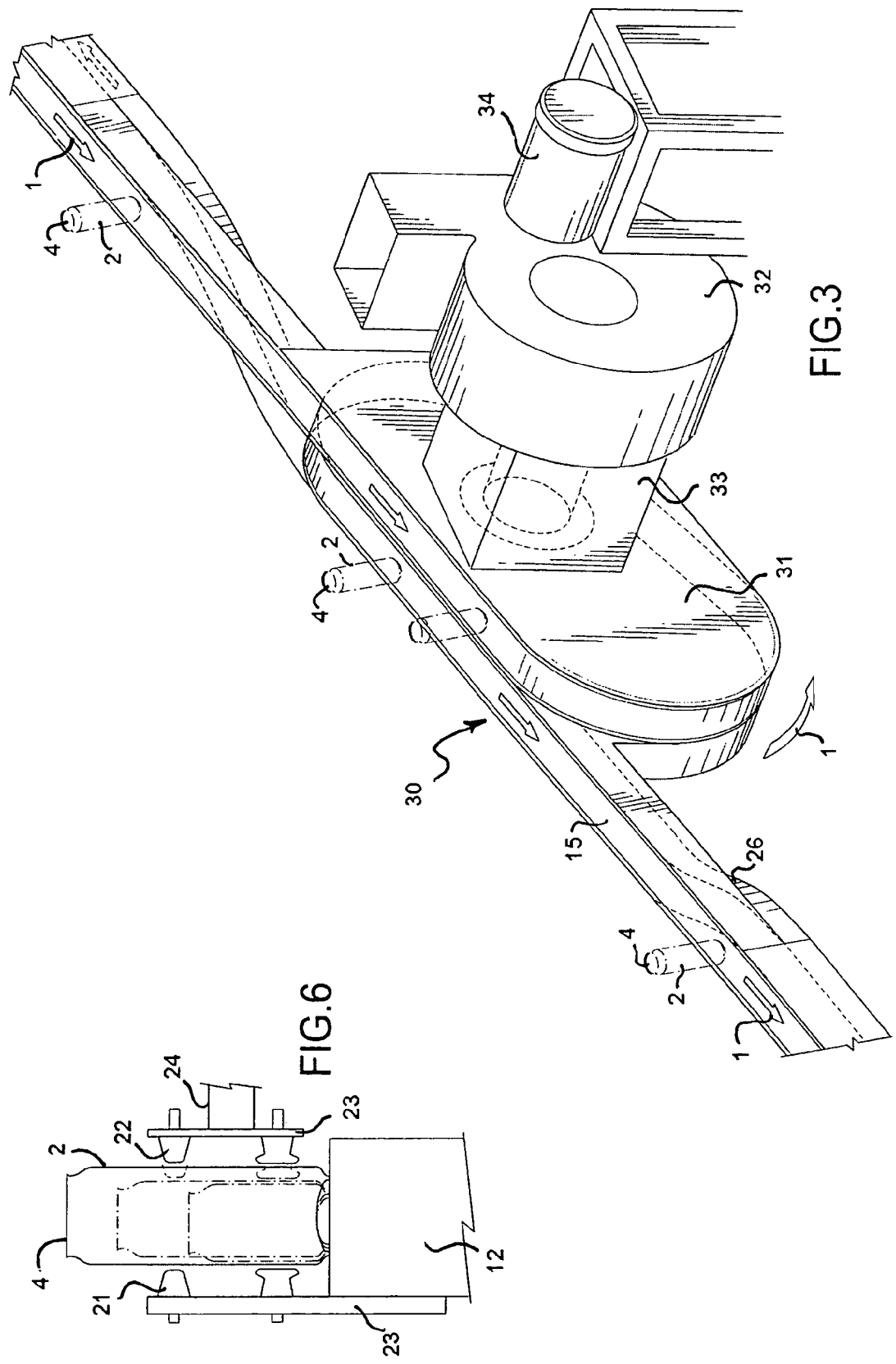

VACUUM LINK CHAIN CONVEYOR

CROSS REFERENCE TO RELATED APPLICATIONS

Pursuant to 35 U.S.C. 119(e), applicant claims the benefit of U.S. Ser. No. 61/463,848, filed, pursuant to 35 U.S.C. 111(b), on Feb. 23, 2011.

STATEMENT OF FEDERALLY SPONSORED RESEARCH

Not Applicable.

BACKGROUND OF THE INVENTION

1. Field of the Invention

The present invention relates to link chain conveyor systems. In particular, it relates to a vertical loop multi-flex vacuum link chain conveyor for use in inverting an open-ended container while running along a conveying path.

2. Description of the Related Art

Conveyor assemblies for transporting open-ended container shells are well known. Such systems often include guide rail track assemblies for guiding the containers along the conveying path. At some point along the conveying path it is also desirably to cause the container to rotate, or invert, for cleaning or coding.

In the prior art, certain conveyor assemblies are designed to include a system of bar-like rail guide members which are bent and connected is a box-like configuration which spirals along as it travels down the conveying path. With this construction, the containers are forced, or gravity feed, through the guide rails in order to axially rotate the cans while traveling along a conveying line. The cans are typically rotated, or inverted, so that the open ends of the can shells may be exposed to a cleaning agent, such a pressurized stream of ionized air or rinse water.

However, certain problems exist in the use of such spiral track systems. Initially, there is an increasing demand upon container processing facilities to treat aluminum container shells differing in height and diameter to encompass the wide range of capacities which are currently in use. For example, in the United States, Australia and New Zealand, for soft drinks, beers and ready mixed spirit drinks, the most universally used diameter is slightly in excess of 65 mm. European countries mostly use a much narrower size of 52 mm for soft drinks and some beers. More recently, the European size has emerged in the United States and Australasian markets with the appearance of energy drinks, such as RED BULL™, which is a product of European origin. One practical difficulty brought about by the use of these differing standard sizes is that the container processing facilities conveyor lines are often designed with at least two separate branching track lanes, running substantially Parallel to one another, where one of each lane is specifically designed to receive a container having a specific diameter and height. This process design requires an additional amount of space, together with an increase in both maintenance and cost which is especially concerning when taking into consideration that only one branch of the line is in use for any given run.

A second problem which is encountered with the prior art methods is that, in use, such systems are also complicated in manufacture and design, and generate a high degree frictional wear on both the component parts of the track system and the container shells. Moreover, because the prior art track rail systems rely on either a forced or gravity fed flow of the containers through the rail sections, the conveyance flow rate of the containers through the system is a rate limiting factor for the entire processing facility.

Therefore, what is needed is a single track conveyor system which is adaptable for use in conveying and inverting containers which are differing in dimension, but which is also simple in manufacture and design, low in cost, durable in construction, and which is also capable of conveying containers through the conveying lanes at a high rate of speed. The present invention satisfies these needs.

BRIEF SUMMARY OF THE INVENTION

It is therefore an object of the present invention to provide a single track conveyor system which is adaptable for use in conveying and inverting containers which are differing in dimension.

It is another object of the present invention to provide a conveyor system which is adaptable for use in conveying and inverting containers which are differing in dimension, but which is also simple in manufacture and design, low in cost, durable in construction, and which is also capable of conveying containers through the conveying lanes at a high rate of speed.

To overcome problems associated with the prior art, and in accordance with the purpose(s) of the present invention, briefly, a vertical closed loop chain link conveyor for inverting an open-ended container is provided. The conveyor has a conveying frame which extends along a lane-like longitudinal conveying path. The frame has a vertical and longitudinally offset closed loop section which is disposed along and in relation to the conveying path. The closed loop section has a change in elevation including a decline and an incline, change in direction, and a central vacuum plenum. A link chain drive assembly includes a drive motor in driven communication with a drive and tail pulley assemblies. A multi-flex link chain is in guided support and travel in the conveying frame while running in trained contact about the drive and tail pulleys. The link chain has a container conveying surface and a clear opening so that the conveying surface is in evacuated communication with the vacuum plenum. At least one suction generator is in ducted communication with the vacuum plenum. The suction generator is capable of creating an under pressurized space on the conveying surface so that the closed bottom end of the open-ended container is retained in contact with the conveying surface while the container is running about the closed loop section of the frame.

Additional advantages of the present invention will be set forth in the description that follows, and in part will be obvious from that description or can be learned or appreciated from practice of the invention. Moreover, the advantages of the invention can be realized and obtained by the invention as more particularly pointed but in the appended claims.

BRIEF DESCRIPTION OF THE SEVERAL VIEWS OF THE DRAWINGS

The accompanying drawings, which are incorporated in and which constitute a part of the specification, illustrate at least one embodiment of the invention and, taken together with the description, explain the principles of the invention through illustration to persons of skill in the art.

FIG. 1 is an isometric view from the top and left hand guide of the vertical closed loop chain link conveyor in accordance with the general embodiment the present invention.

FIG. 2 is an enlarged isometric view of the multi-flex plastic link chain for travel, in guided support, in the conveying frame showing the clear hole for evacuated communication of the conveying surface of the link chain with the vacuum plenum.

FIG. 3 is an isometric view taken from the top and right hand of the vertical closed loop chain link conveyor.

FIG. 6 is a front sectional view, through section 6 of FIG. 7, where the frame includes at least two opposing guide rails.

DETAILED DESCRIPTION OF THE DRAWINGS

Figure 4:
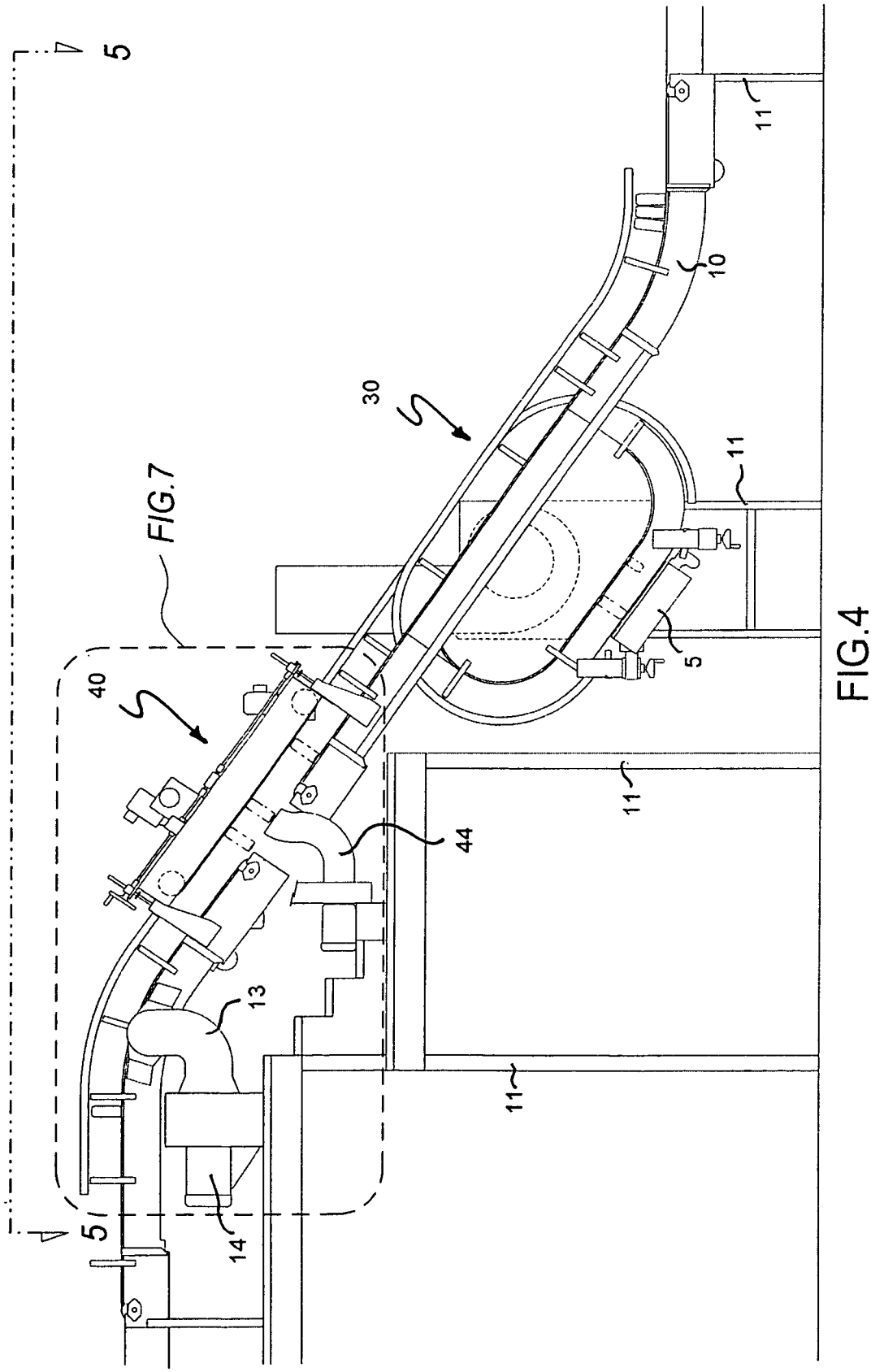
FIG. 4 is an elevation view of another embodiment of the vertical closed loop chain link conveyor showing the additional feature of including the second change in elevation frame for use in transferring a printable indicia to the bottom wall of the open-ended container.
Figure 5:
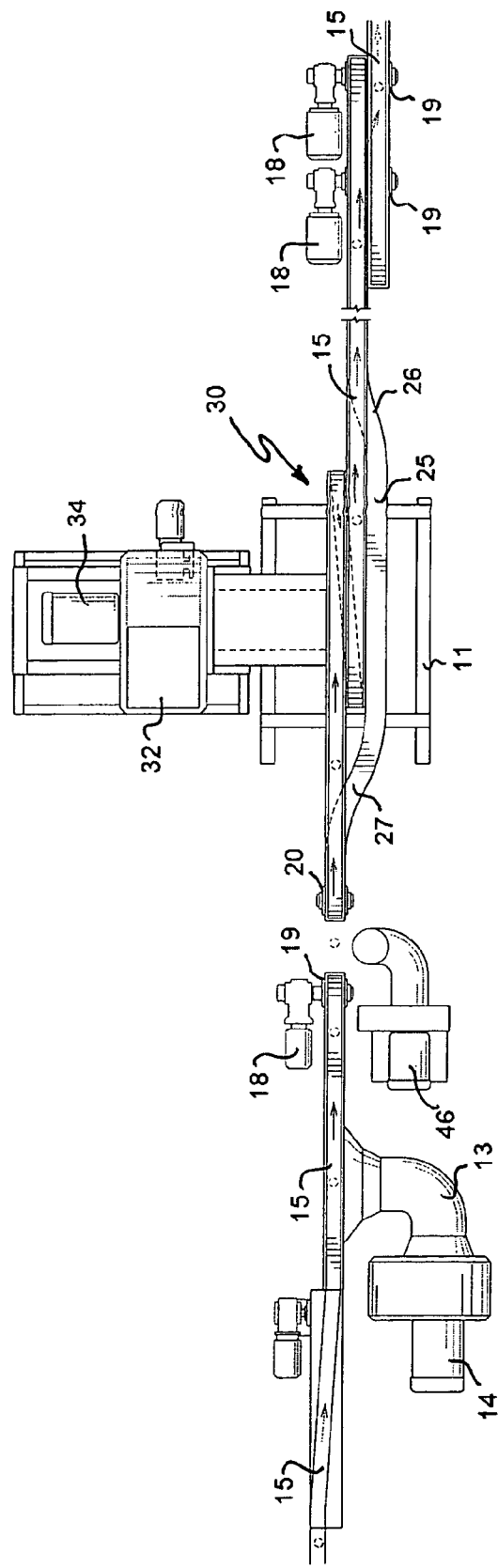
FIG. 5 is a top view of the embodiment shown in FIG. 4.
Figure 7:
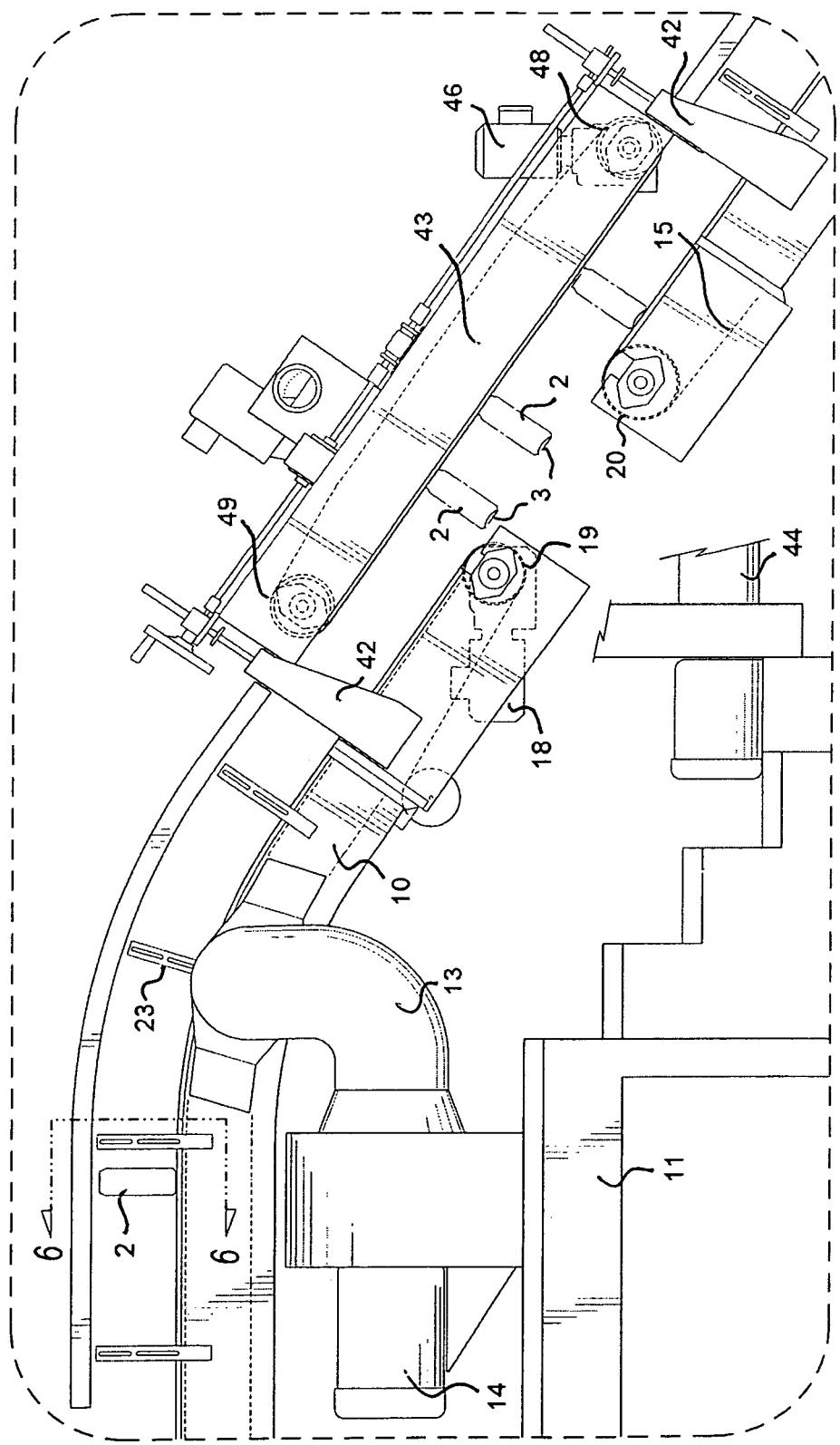
FIG. 7 is an zoomed illustration of dotted outline portion of FIG. 4, shown as 7, which illustrates the conveying path as it includes a second change in elevation segment where the bottom of the container is released from the first link chain and where the open end of the container is concurrently secured, by suction, to the second link chain so that the bottom wall of the container is capable of being printed with a coding indicia.

Excepting only those specific definitions specifically defined herein, all scientific and technical terms have the same ordinary meaning as would be commonly understood by a person of skill in the art to which this invention belongs. Specifically, as used in this disclosure, the terms "vacuum" and "suction" are interchangeable. The terms "vacuum" and "suction" are not intended to be limited to mean only a perfect vacuum but are intended to mean also a relative vacuum, or under-pressurized condition, with respect the ambient pressure and which is sufficient to adhere any section of a container to the link chain conveying surface while running on a link chain vacuum conveyor. The terms "container", "can", and "shell" are interchangeable and are intended to include items having aluminum, steel, or composite materials in construction and which are variable in diameter, height, or capacity. In use, the term "container" and "can" includes those items having a "shell". The term "shell" includes an open guided container extrusion having an open top section, a circumferential guide wall and a bottom end. The bottom end, or wall, may, but need not, include a central concave section.

Although many methods and materials similar or equivalent to those described herein, can be used in the practice or testing of the present invention, the preferred methods and materials are now described. Reference will now be made in detail, to the presently preferred embodiments of the invention, including the examples of which are illustrated in the accompanying drawings wherein like numerals will be used in order to represent like features of the present invention.

The present invention provides a endless multi-flex link chain vacuum conveyor assembly. The conveyor assembly transports open-ended aluminum can shells along a lane-like conveying path 1. The conveyor assembly is constructed as a rigid frame 10 assembly of aluminum, stainless steel, or steel beam sections connected together so that the link chain 15 lays flat. The beam sections may, but need not, include guide grooves for easy installation of guide rails. The conveyor frame 10 and is elevated from the sub-floor of the container processing facility on a series of support legs 11.

The frame 10 includes a vacuum box 12, under a vacuum effect, having at least one perforation extending lane-like in the direction of the conveyance path 1 of the conveyor. The frame is preferably fabricated of 10 gauge steel. The vacuum box 12 extends underneath the multi-flex link chain conveyor so that the multi-flex link chain 15 lines an under-pressurized space. The vacuum box 12 is connected to a blower fan assembly with a vacuum duct 13. The blower fan assembly is driven with an electric motor 14. The blower fan assembly is designed so that, in operation, is causes an under-pressurized condition on a conveying surface 16 of the multi-flex link chain 15 to adhere a bottom wall 3 of an open-ended aluminum container 2 to the multi-flex link chain conveying surface 16.

The multi-flex link chain 15 is an assembly of stainless steel or hard plastic formed link members. However, in the presently preferred embodiment of the present invention, the multi-flex link chain 15 is an assembly of molded hard plastic link members which are loosely and pivotally attached, by pivot pins, so that the link chain 15 is capable of flexing in both a lateral turn and a change in elevation directions. Each of the link members is preferably drilled with at least one clear hole 17 so that the upper conveying surface 16 of the chain operates in the under-pressurized condition. In the preferred embodiment, the clear holes are drilled to a diameter of 7.9 mm, and the link chain is 7.9 cm in width. The multiflex plastic link chain 15 is driven by a conventional drive assembly. The drive assembly includes a drive motor 18 in driven communication with the drive 19 pulley and the tail 20 pulley. In the preferred embodiment, the drive motor 18 is a 2 horse power motor and the pulleys 19, 20 are 20.3 cm in diameter carried on a 1.11 cm drive shaft. The pulleys 19, 20 are assembled with any well known component parts including rollers; bearings; and axle shafts. The axle shafts are connected to the frame 10.

As above, the beam sections may, but need not, include accessories such as an array of guide rails 21, 22 extending along the conveying path 1. In at least one preferred embodiment, the span, or distance, between the guide rails 21, 22 is adjustable to guide the containers, in single file, along the conveying path 1. To this end, it is desired that at least one of the guide rails 22 is preferably connected to a guide rail supporting member 23.

The conveyor includes a vertical endless closed loop section 30 disposed along and in a lateral offset relationship to the conveying path 1. The offset configuration, of the conveyor while running through the loop section 30 in relation to the conveying path 1, results in a spiral run so that the conveying path 1 is capable of entry and exit to the loop section 30 on substantially the same horizontal plane. The closed loop section 30 of the conveyor operates to cause the open end of the open-ended container 2 to be exposed to an apparatus 5 for delivering a cleaning agent to the interior of the container 2, such as a stream of ionizing air or water rinse, as it revolves about the loop section 30 of the conveying path 1. In use, the containers 2 travel along the conveyance path 1, enter the loop section 30, and decline in elevation where the change in both vertical and horizontal direction occurs at a very high rate of speed, in a range of 100 to 2,200 cans per minute. Thus, it can be appreciated that the conveyance of the open-ended container through the loop section 30 causes a significant centrifugal force to act on the container 2 which removes any remaining particulate matter or rinse from the opening of the open-ended container 2.

The vacuum plenum 30 is also under a vacuum effect and also has at least one perforation extending lane-like in the direction of conveyance of the conveyor as it runs about the loop section 30. An outer periphery of the vacuum plenum 31 extends underneath the multi-flex plastic link chain 15, along the conveying path 1, so that the multi-flex link chain 15 lines an under-pressurized space about the periphery. The vacuum plenum 30 is also connected to a blower fan assembly with a vacuum duct 33. The fan assembly is also driven with an electric motor 34. In a preferred embodiment the electric motor 34 is rated at 20 horse power. As, above, this blower fan assembly is also designed so that, in operation, it causes an under-pressurized condition on a conveying surface of the multi-flex plastic link chain 15 to adhere a bottom wall 3 of the open-ended container 2 to the multi-flex link chain conveying surface 16. In this manner, room air is drawn through the clear holes 17 drilled in the multiflex plastic link chain, into the vacuum plenum 31, and through the duct 33 where it is exhausted back into the room with the blower 32.

Because the present invention is an endless conveyor, a segment of the return lane 25 makes an outward 26 and then an inward 27 a pair of arc segment turns so that this portion of the return lane is capable of running past the loop section 30 and its vacuum plenum 31.

Canner facilities normally print a code on the bottom wall of aluminum cans to identify different canners and beverage companies. The can code often includes code labeling indicia which identifies the best use by date, time of day canned, canner location, actual date canned, and shift. In order to adapt the conveyor, of the present invention, to print the code indicia on the bottom wall of the cans 2, yet another embodiment is provided where the foregoing elements of the conveyor are combined with a second change in elevation conveyor segment 40, disposed along the conveying path 1, for printing the indicia, on the bottom wall 3, of the container to be cleaned before it enters the loop portion 30. The second conveyor 40 is also an endless multi-flex link chain assembly which is preferably suspended, in horizontal alignment, above an interruption in the line of the first conveyor. The second change in elevation conveyor segment 40 also includes a second rigid frame 41 assembly of aluminum, stainless steel, or steel beam sections connected together so that the second link chain 45 lays flat. The second conveyor frame 41 is preferably suspended above the first frame 10 by support legs 42 connected to the first frame 10. The second frame 40 also includes a second vacuum box 43, under a vacuum effect, also having at least one perforation extending lane-like in the direction of the conveyance path 1 of the second conveyor. The second vacuum box 43 extends above the second multi-flex link chain 45 conveyor so that the second multi-flex link chain 45 lines the under-pressurized space above the second multi-flex link chain 45. The second vacuum box 43 is also connected to a blower fan assembly with a vacuum duct 44. The blower fan assembly is also driven with an electric motor 46. The blower fan assembly is also designed so that, in operation, it causes an under-pressurized condition on a conveying surface of the multi-flex link chain 45 to adhere the top opening of the open-ended container 2 to the second multi-flex link chain conveying surface running above the container. The second multi-flex link chain 45 is preferably of the same type as described above, is also drilled with at least one clear hole, and is driven by a second drive motor 46 in driven communication with a second drive 48 pulley and the tail 49 pulley. The second multi-flex link chain 45 is adapted to travel in trained contact about the second drive 48 and tail 49 pulleys. The second blower assembly is in ducted 44 communication with the second vacuum box 43 so that the open end 4 of the open-ended container 2 shell is releasably secured to the upper conveying surface of the second multi-flex link chain 45, by an under-pressure condition, as the bottom wall 3 of the container 2 is released from contact with the conveying surface 16 of the first link chain 15. This transfer of the container to the second conveyor allows the bottom wall 3 of the container to be exposed to an any well known assembly for printing code labeling indicia on the bottom wall 3 of the container while the open end 4 of the container is running in evacuated contact with the conveying surface 47 of the second multi-flex link chain 45 conveyor segment 40.

After printing, and as the open end 4 of the container travels out of the under-pressurized condition, the open end is released from the second conveying surface 47, the bottom wall of the container 2 is once again adhered to the conveying surface 16 of the first multi-flex link chain 15 so that container is capable of entering the closed loop section 30 of the conveyor frame 10, for cleaning.

In use, the present invention provides a method for printing a code, and cleaning aluminum containers of differing dimensions in a single lane at a high rate of speed. The multi-flex link chain drive assemblies and blowers are powered up so that the link chain conveyors are running and a sufficient under-pressurized condition is established in the vacuum boxes 12, 43 and vacuum plenum 31. The open-ended containers 2 are then feed, from pallets, onto the multi-flex link chain 15 in an upright position so that a bottom ends 3 of the containers 2 are capable of being secured to the conveying surfaces 16 of the multi-flex link chain 15. As the containers 2 run down the lane-like conveying path 1 they are printed with the predetermined code indicia and continue to travel about the closed loop section 30 of the conveying frame 20, where the open ends of the containers 2 are subject to the centrifugal force and exposed to the ionizing air or water delivery device 5 in order to clean and decontaminate the containers of any particulate matter.

While, the present invention has been described in connection with the preferred and illustrated embodiments, it will be appreciated and is understood that certain modifications may be made to the present invention without departing from the true spirit and scope of the invention.

I claim:

1. A closed loop mult-flex chain link vacuum conveyor, compromising:
    (a) a conveying frame, said conveying frame including a pair of side walls being connected in an opposite spaced relationship by a top wall, said side walls and said top wall being a central vacuum plenum, said top wall further including of clear openings so that said top wall is capable of evacuated communication with said central vacuum plenum, and whereby said wall further defines a vacuum track conveying path, said conveying path having a running direction, said running direction including entry segment, an exit segment, and a laterally offset closed loop segment disposed therebetween;
    (b) a link chain drive assembly including a drive motor in driven communication with a drive and a tail pulley assemblies;
    (c) a multi-flex link chain conveyor being driven said drive assembly, said conveyor capable of running on an incline, a decline, and a side flexing, said conveyor further including a flat top-surface portion having a through void for evacuated communication of said top-surface portion with said top wall and said vacuum plenum while said conveyor is running in trained contact with said top wall so that an article to be conveyed thereon is capable of conveyance in an upright inverted position while running through said closed loop segment; and
    (d) a suction generator in ducted communication with said central vacuum plenum.

2. The closed loop vacuum conveyor according to claim 1, wherein said article is an open ended container and said open end of said container is exposed to a cleaning agent while running through said closed loop segment.

3. The closed loop vacuum conveyor according to claim 1, wherein said conveying frame further includes at least two oppositely aligned guide rails, wherein at least one of said rails includes an actuating member, said actuating member adapted to slidingly adjust a lateral span width between said guide rails as a function of a circumference of said article to be conveyed thereon.

4. The closed loop vacuum conveyor according to claim 2, wherein said cleaning agent is ionized air.

5. The closed loop vacuum conveyor according to claim 2, wherein said cleaning agent is an aqueous solution.

6. The closed loop vacuum conveyor according to claim 2, wherein said cleaning agent is a centrifugal force.

7. The closed loop vacuum conveyor according to claim 3, wherein the actuating member is connected to a controlling circuit.

8. The closed loop vacuum conveyor according to claim 1, further comprising a multi-flex link chain guide connected to the top wall.

* * * * *